July 7, 1964    R. L. PERL    3,140,388
ELECTRICALLY HEATED COOKING ASSEMBLY
Filed Aug. 16, 1960    4 Sheets-Sheet 1

INVENTOR.
RICHARD L. PERL
BY
Oberlin, Maky & Donnelly
ATTORNEYS

INVENTOR.
RICHARD L. PERL
BY
Oberlin, Maky & Donnelly
ATTORNEYS

July 7, 1964    R. L. PERL    3,140,388
ELECTRICALLY HEATED COOKING ASSEMBLY
Filed Aug. 16, 1960    4 Sheets-Sheet 3
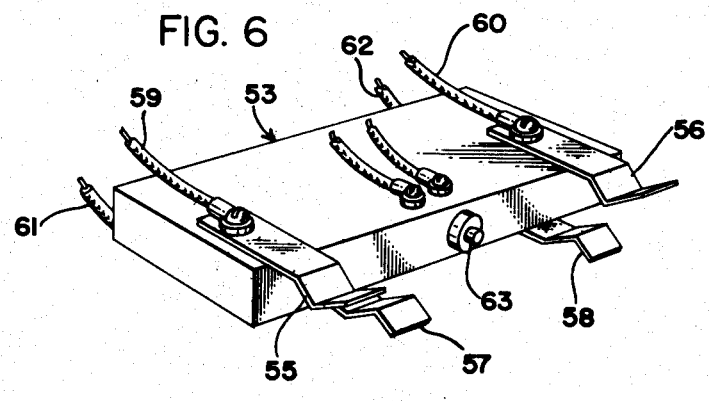
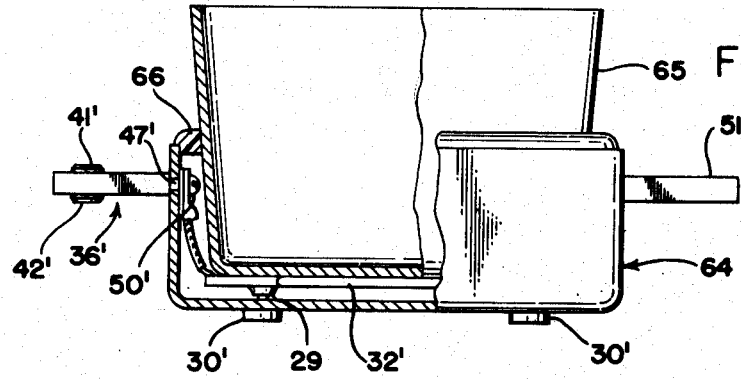
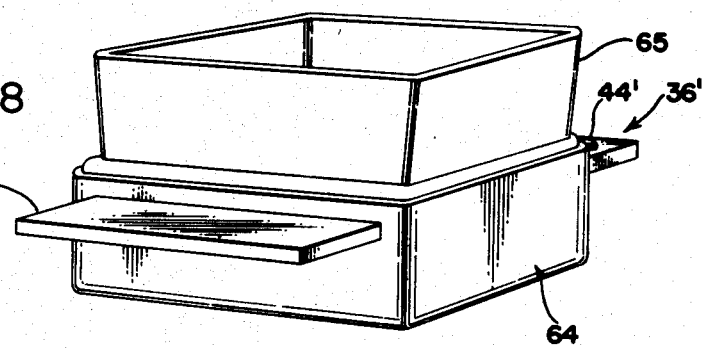
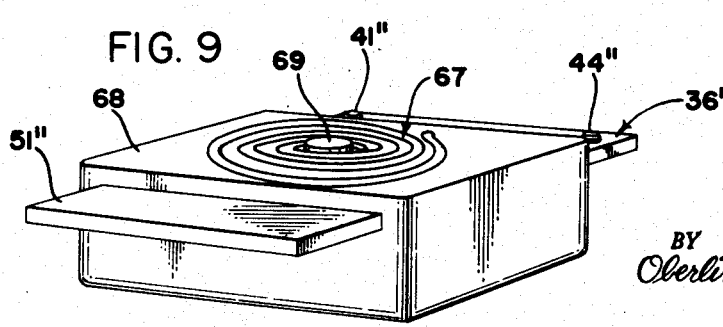
INVENTOR.
RICHARD L. PERL
BY
Oberlin, Maky & Donnelly
ATTORNEYS July 7, 1964 R. L. PERL 3,140,388
ELECTRICALLY HEATED COOKING ASSEMBLY
Filed Aug. 16, 1960 4 Sheets-Sheet 4
FIG. 10
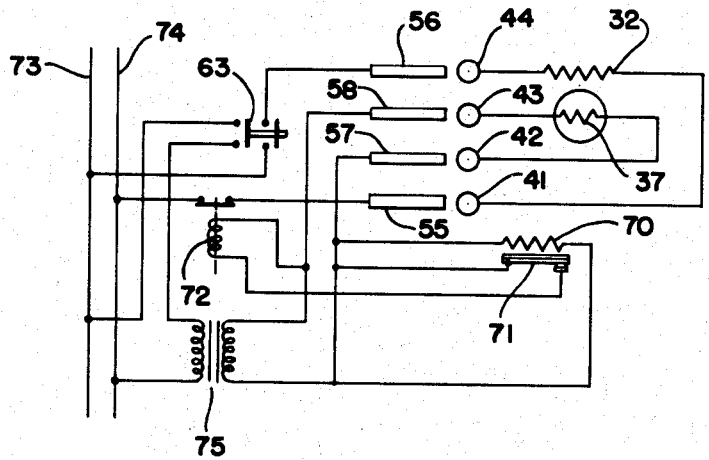
FIG. 11
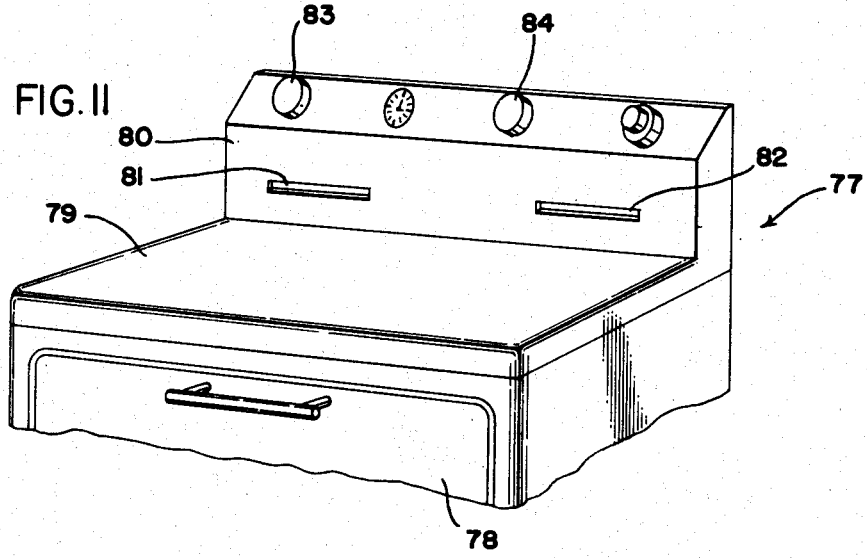
FIG. 12 FIG. 13
INVENTOR.
RICHARD L. PERL
BY
Oberlin, Mahy & Donnelly
ATTORNEYS

United States Patent Office 3,140,388
Patented July 7, 1964

3,140,388
ELECTRICALLY HEATED COOKING ASSEMBLY
Richard L. Perl, Mansfield, Ohio, assignor to The Tappan Company, Mansfield, Ohio, a corporation of Ohio
Filed Aug. 16, 1960, Ser. No. 49,915
20 Claims. (Cl. 219—435)

This invention relates to a cooking assembly characterized by improved means for performing those heating and cooking operations usually carried out in portable containers on the surface heaters of a conventional range or cooking top.

A primary object of the invention is to provide a novel portable cooking vessel or container of the type which includes, in combination, an electric heating element, this new container offering a much wider range of use than the usual devices on such order provided heretofore and obviously nothing more than kitchen appliances. In contrast, the new vessel with its self-contained heater is of such construction as to be entirely suitable and acceptable for added use as a serving dish at the dining table, for example, and lends itself readily to ornamentation further to enhance the extension of the use beyond the limits generally imposed by housewives on the available devices of this nature.

Another object is to provide a cooking unit of portable vessel type and including a contained electric heater in which the vessel is thermally insulated in improved manner for greater efficiency, safety and use.

It is also a principal object of the present invention to provide an electric cooker of the class noted having novel and superior means for connection of the heating element or elements thereof to a source of energy, such connector means greatly facilitating this operation and additionally substantially enhancing the appearance of the unit.

A further object is to provide a combination of such an electric cooker and a cooperable source terminal assembly in which direct and substantially rigid engagement of the two is utilized for energization of the former through the latter. The nature of this engagement is, furthermore, such to afford extremely easy and convenient connection and disconnection of the cooker from the terminal assembly.

Related objects are to provide, for use in such combination, a source terminal assembly which is normally obscured when not in use, and such an assembly including circuit means for maintaining the terminals thereof normally disconnected from the source, with the bringing of the cooker into operative association with the assembly resulting in automatic completion of the energization circuit.

An additional object of the invention is to provide a portable electric cooking unit in which different vessel or food containing components varying in capacity can be substituted for selective association with base structure, primarily to facilitate manufacture and supply of a series of such units of different size and also permitting replacement of an original vessel component with another of the same or a different size.

A further object is to provide a portable electric cooker incorporating automatic temperature control means of improved sensitivity and accuracy, with connections for energization and functioning of such control means accomplished similarly as those for energization of the heating element or elements as above mentioned.

It is a further object of the invention to provide a combination of multiple electric cookers and source terminal assemblies on the order discussed in a novel organization for simultaneous performance of plural cooking operations in a defined area, and a related object is the provision of range type construction, including an oven, wherein such a combination replaces all or some of the usual surface heaters.

Another object of the invention is the provision of a cooking assembly in which plural portable electric cookers are cooperable respectively with commonly housed terminal devices of the character previously noted, and the construction and organization of the terminal devices and the connector means of the cookers are such that efficient utilization of space is realized, without requiring precise positioning of the cookers relative to the terminal devices for proper connection and operation. This last characteristic obtains in the preferred relation of an individual cooker to the source terminal assembly provided for energization thereof, and the obvious advantage gained by obviating critical relative positioning makes the individual connection convenient for the housewife and, in the multiple cooker assembly, adds an element of accommodation for the cookers in close array. This nature of the individual connection, moreover, reduces the possibility of de-energization of an operative cooker as the result of inadvertent shifting of the same.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 6 is a perspective view of one of the source terminal assemblies;

FIG. 7 is a partially broken side elevation of a further portable electric cooking unit;

FIG. 8 shows the unit of FIG. 7 in perspective;

FIG. 9 is a perspective view of another type of portable heating unit;

FIG. 10 is a line diagram showing the preferred circuitry for energization and control of the portable electrically heated vesesls;

FIG. 11 shows in perspective and broken away a different type of range embodiment for the present improvements;

FIG. 12 is a fragmented section showing a detail of a range wall or other enclosure for the source terminal assembly; and FIG. 13 is a similar section including a portable cooker, engaged through the enclosure, with the terminal assembly.

Figure 1:
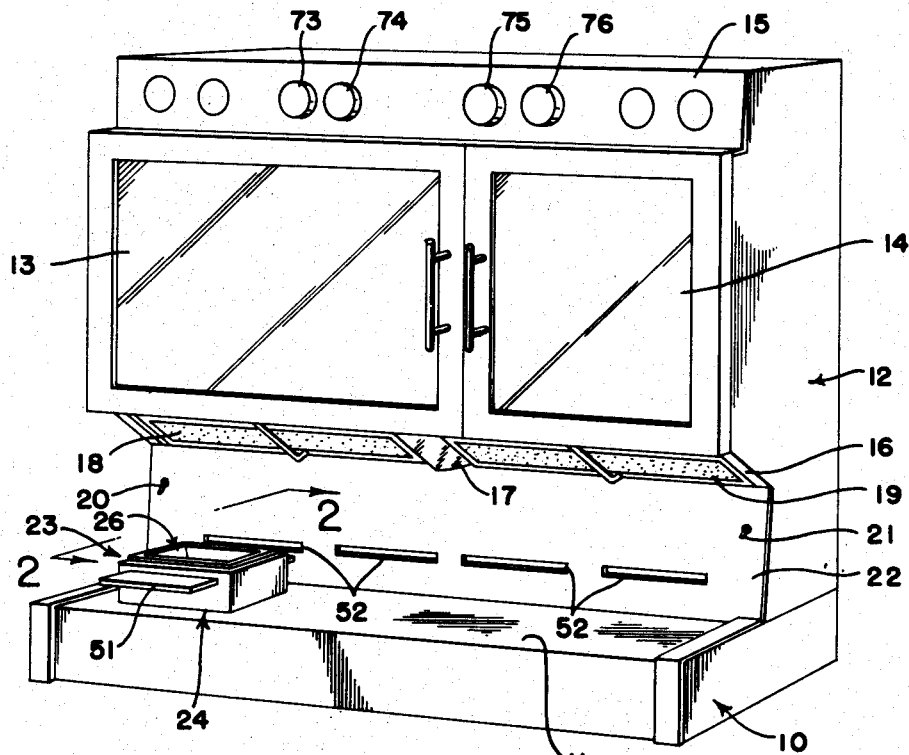
FIG. 1 is a perspective view of an electric range incorporating the improvements of the present invention.
Figure 2:
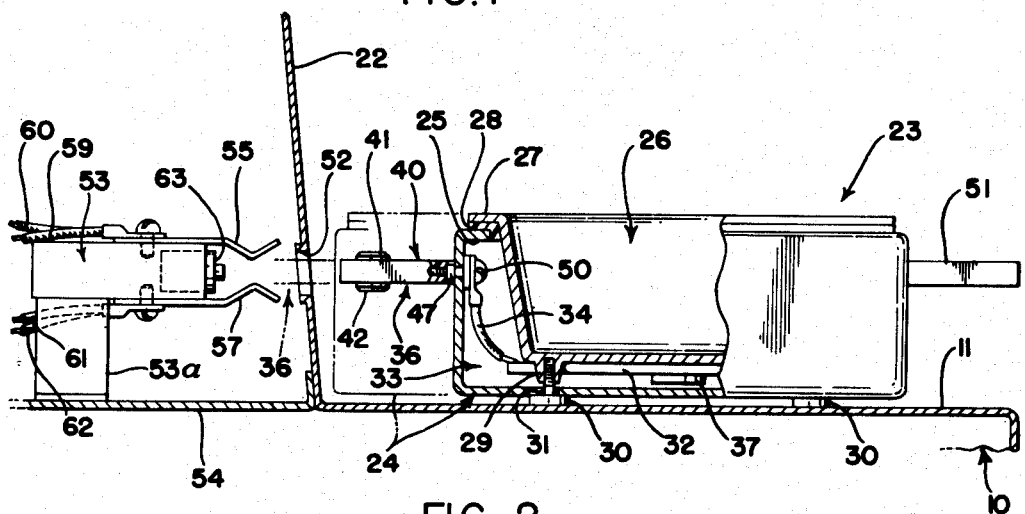
FIG. 2 is a fragmentary sectional view taken approximately on the line 2—2 in FIG. 1 and showing, on an enlarged scale, an assembly of one of the new portable electric cookers and a source terminal assembly therefor.
Figure 3:
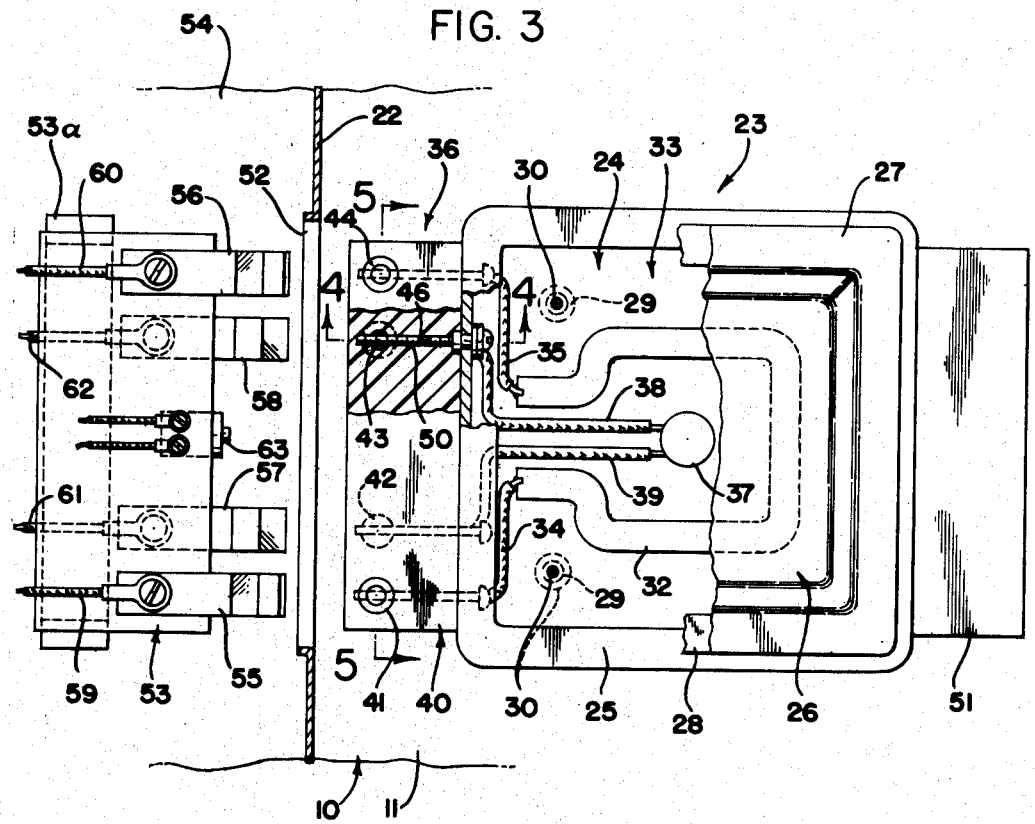
FIG. 3 is a top plan of the assembly illustrated in FIG. 2, with portions of the cooking unit broken away and sectioned for better understanding of the construction.

Referring now to the drawings in detail, the present improvements are shown in FIG. 1 incorporated in a range combination adapted to be hung on a wall or supported on separately provided base cabinet structure and the like. The range proper comprises a relatively shallow, horizontal base section 10, the front portion of which is exposed to provide a shelf or working surface 11 extending across the front of the range at this elevation, and an oven section 12 which extends upwardly along the rear of such working surface and then forward partially over the latter at an upper elevation.

Within this upper relatively enlarged or partially projecting portion of the range, there are two electric ovens 13 and 14 respectively provided with window-containing doors. The oven 13 at the left is of larger capacity and arranged with its longitudinal axis parallel to the front, while the smaller oven 14 at the right, the two being immediately adjacent, occupies the remaining space between the inner end of the large oven and the right side of the range, the two ovens being of the same height. A control panel 15 extends across the top front of the range above and slightly inward with respect to the oven doors, and there is an inclined front section 16 just below the doors in which a lamp 17 is centrally disposed for illumination of the shelf or working surface. An air intake opening is provided in this last section to either side of the lamp, and filters 18 and 19 of metallic ribbon and the like are removably supported in such openings. A pair of suction fans, not shown. is provided within the housing to the rear of such openings and connected respectively to draw air in through the same, with discharge at the back of the range and preferably through an external conduit to the exterior of the building in which the range is located. These fans of course serve to exhaust the area of the working surface 11 and are individually controlled by switches the actuators 20 and 21 of which appear at the respective sides of the remaining front panel 22 which extends substantially vertically from the noticeably inclined section 16 to the top of the working surface 11.

The described double oven arrangement, the relation thereof to a lower projecting base section, and the provision of power venting means are features which are known and embodied in electric ranges made by The Tappan Company, assignee of the present application, and need not be set forth in further detail in order fully to understand the nature and operation of the present improvement. As evidenced by the stated objects of this invention, the latter is concerned generally with that part of the range which would ordinarily be utilized for surface cooking operations and the like and would comprise a plurality of exposed heating elements. In the prior range under discussion, such elements are located for use at the top of the forward projection of the base section; in the illustrative embodiment of the present invention shown in FIG. 1, however, it will be seen that there are no such exposed heating elements, the shelf 11 being solid and provided for purposes of support.

Such elimination of the usual surface elements has been made feasible by the employment of a new and improved assembly of an independently heated utensil or food container such as the one designated generally by reference numeral 23 in FIG. 1, wherein it is shown supported on the shelf 11, and cooperable range circuits and controls therefor. As shown in detail in FIGS. 2–5, the utensil 23 comprises a base 24 having a bottom and continuous side walls, with an inturned flange 25 around the open top of the member. A separately formed vessel 26, adapted to hold food and the like, is fitted in the base and releasably joined therewith.

The vessel 26, corresponding in shape to the base 24, in this embodiment has an out-turned upper flange 27 opposed to the base flange 25, and a continuous sealing strip or gasket 28 is interposed between such flanges. The vessel bottom is provided with four integral external corner projections 29 in which tapped holes are formed and attaching screws 30 passed through openings provided in the bottom of the base are threaded in such projections of the vessel to draw the same into the base and tightly against the upper perpiheral sealing strip 28. The attaching screws 30 are sealed in the bottom of the base by O-rings 31 or the equivalent.

An electric heating resistance element 32, which is conventional per se, is applied to the bottom exterior of the vessel 26, for example, by casting therewith, and it is to be noted that the bottom and side walls of the vessel are spaced inwardly with respect to the corresponding surrounding portions of the base to provide an inner void 33. The latter of course has an insulating effect and can be filled with suitable insulation material further to reduce the transfer of heat from the vessel to the base. The ends 34 and 35 of the electric heating element are brought to the adjoining side wall of the base, to a handle assembly 36 which also serves as an electrical contact member.

A temperature sensing disc 37, containing a resistor the resistance value of which is proportional to the temperature thereof, is also applied externally to the bottom of the vessel, centrally thereof, and its wires or leads 38 and 39 are brought to the same side wall of the vessel for connection to the exterior handle assembly 36.

Figure 4:
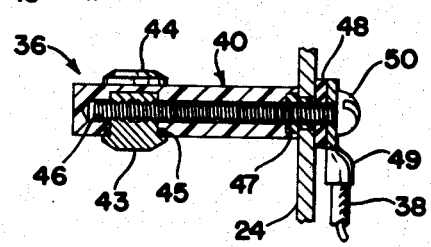
FIG. 4 is a fragmentary transverse section taken on the line 4—4 in FIG. 3 and on an enlarged scale.
Figure 5:
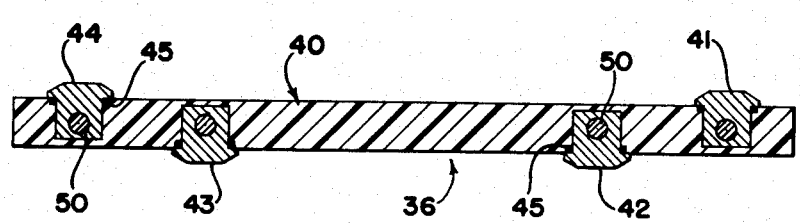
FIG. 5 is a longitudinal section, with the same scale enlargement as in FIG. 4 the plane of which is indicated by the line 5—5 in FIG. 3.

Such handle assembly comprises a rectangular body 40 of heat-resistant plastic or other insulation material and is disposed with one of its long sides against the noted side wall of the base 24. Four headed metal inserts 41–44 are fitted in recesses provided therefor in the handle, here arranged in a row with two inserted from the bottom and two from the top. Each insert is sealed by an O-ring 45 in the handle and the shank thereof is provided with a transverse tapped bore. Intersecting bores in the handle body extend from just outside the respective insert recesses to the inner edge against the base side wall, and the latter is provided with respectively aligned holes. With particular reference to FIG. 4, the horizontal bore 46 in association with the insert 43 is enlarged at its inner end, with respect to the aligned hole in the base side wall as well, and a heat seal 47 has its flanged end in the mouth of the bore and its body passing through the wall opening. Such seal is made of insulating material, and an insulating washer 48 is disposed thereagainst at the inner side of the base wall. The wire end 38, in this case from the temperature sensing disc, is provided with an apertured terminal 49, and a long screw 50 is passed from the inside of the base through such terminal, the washer, the hat seal, freely through the handle bore, and is threaded through the shank of the insert 43. The inserts 42, 41 and 44 are connected respectively to the other wire 39 from the temperature sensing disc and the two ends 34 and 35 of the electric heating element 32 in the same manner, and the handle is of course thus secured to the base, with the exposed four heads of the inserts providing contacts or terminals of the vessel circuits. The inserts can, incidentally, be all disposed at the same side of the handle and may be formed with tubular instead of solid shanks. A further handle 51 of the same material and size is secured externally at the opposite side wall of the base 24 by ordinary means, such as screws. This further handle does not serve any contact function and complements only the handle function of the first-described assembly 36.

For purposes of using this and other similar electric cookers in the range combination, the substantially vertical panel 22 at the rear of the shelf 11 is provided with a series of elongated horizontal apertures 52 each of a size and disposition to pass the contact handle of such a cooker with the latter supported on the shelf. Behind each aperture there is a source terminal and control assembly of the type shown in FIGS. 2, 3 and 6. The first of these figures shows the cooker in full lines in an outer or retracted condition from which it is pushed inwardly to the position indicated by the partial dashed outline to insert the contact handle 36 through the left end aperture 52. It will also be noted from FIG. 3, that the width of this aperture is appreciably greater than that of the handle, whereby significant clearance is provided between the ends of the handle and the vertical edges of the panel at the aperture. For reasons which will be later explained, this clearance is of practical importance.

An insulative block 53 is mounted within the range casing behind each aperture 52 in spaced relation and at the same elevation by a bracket 53a on a suitable platform 54. Spring contact blades 55 and 56 are secured to the top of each such block respectively adjacent the ends thereof and project generally horizontally toward the associated aperture, while two more blades 57 and 58 are correspondingly secured at the bottom of the block in such projecting relation respectively inboard of the first mentioned blades. It is also to be noted that these blades are of appreciable width, and they are disposed respectively to be engaged by the four handle contacts 41–44 when a cooker as described is moved to the noted condition for energization and use thereof. Wires 59 and 60 respectively connected to the outer blades can thus be utilized to energize the electric heating element 32 of the illustrated cooker from an available source, while wires 61 and 62 are similarly in circuit with the temperature sensing device 36 for applying the latter to control of the cooker energization. While the connections made in this manner are shown as comprising a single blade and button, each of the handle contacts can be double headed for exposure at both top and bottom of the handle and a pair of blades would then be utilized for simultaneous engagement therewith.

As a safety measure, a push-button switch 63 is mounted in the forward edge of the terminal block, with its actuator spring biased forwardly to normal open position. The disposition of this switch is such that the actuator is engaged by the leading edge of the cooker handle and pushed inwardly for closure of the switch upon full insertion of the handle. Such switch can be utilized in the energization circuit of the heater, so that voltage is applied to the contact blades only upon such use engagement thereof.

It will be clear that a plurality of such electric cookers can be employed simultaneously in the range in number corresponding to the terminal assemblies provided therefor of the character described. Thus the range illustrated in FIG. 1 provides, in effect, four utensil cooking functions at the same time, and the previously noted clearance between the handles and the apertures, together with the width of the stationary contact blades and the equally appreciable area of the handle contacts, both eliminates the necessity for critical positioning of the cookers and provides accommodation of a plurality thereof side-by-side. In other words, a certain amount of lateral shifting of a connected cooker is accommodated without disruption of the operation thereof.

The cookers may vary in design, particularly with respect to capacity, to make available a series of vessels of different sizes most commonly used. In FIGS. 7 and 8, a slightly different base 64 and vessel 65 combination is shown, wherein the base does not have an inturned upper flange. The vessel is here of considerably greater height and hence capacity, and a sealing ring 66 is wedged between the upper end of the base 64 and the vessel wall surrounded thereby. The construction is otherwise the same as in the case of the vessel first described, as indicated by the use of the primed reference numerals. In each instance, the noted sealing of the various components makes the combination liquid tight, whereby the entire unit can be immersed in cleaning solution and the like. Moreover, the vessel components can obviously be replaced for substitution of new similar or different vessel parts, and the same base can be used in manufacture as a common component for use with variously sized vessels.

Should it be desired to provide the user of the range with an exposed surface heating element of conventional type, the unit shown in FIG. 9 is employed. A conventional convoluted electric heating element 67 is here mounted in a box-like assembly 68 similar to the base unit of the cooker previously described and is provided with a center temperature sensing unit 69 also of known type. The sensing unit and the respective ends of the heating element are brought to a handle contact assembly 36″ on the order set forth, and the manner of connection is the same.

The cookers disclosed are provided with temperature sensing elements, since this is a generally desirable feature, but one or more cookers obviously could be made in simpler form without such a control element. It has been found that cookers according to the present invention which are so equipped provide much more sensitive and accurate control, with the usual external circuits, than available electrically heated fry pans and the like. For example, the accuracy of a standard available fry pan having such a temperature control is limited to plus or minus 25° at a 315° setting, while one of the new units maintains temperature within plus or minus 3° at the same setting.

A typical control circuit is shown by the wiring diagram in FIG. 10, and it will be seen therefrom that a heater 70 of a bi-metal switch 71 is connected in parallel with the temperature sensitive resistance 37 to control the opening and closing of a solenoid 72 in the main heater circuit in accordance with temperature. The safety switch 63 operates to close the heater and sensing circuits in response to cooker handle insertion, as earlier set forth, with the former including line conductors 73 and 74 and the latter as step-down transformer 75 to energize the control at the usual lower voltage. This system is known as such, but operates in the new cookers with the greatly increased efficiency noted above. The range will of course be provided with controls for individually adjusting the several bi-metallic switches, and four knobs for the purpose are shown at 73–76 at the control panel at the top of the range. The cookers can thus be separately controlled with regard to temperature.

FIG. 11 shows a different type of range environment for the cookers, this range 77 being of smaller and free-standing type, with a usual oven 78 below the top surface 79. The latter is essentially the support for the cookers, and a vertical back panel 80 is provided with two apertures 81 and 82 behind which the source terminal assemblies previously described are housed for cooperation with the cooker handles. Controls having knobs 83 and 84 at the back panel are provided respectively to control the aperture circuits.

In all cases the knobs and apertures can be color coded for correspondence, that is, each aperture would have a proximate different color mark and the knob of the associated control would be of the same color or identified by such color in some other suitable readily apparent manner.

FIGS. 12 and 13 show an aperture 52′ provided with a pair of spring doors 85 and 86 normally closing the same and opened by the handle 36 upon insertion of the latter. Another closure expedient would be a sliding door cammed out of the way by the handle when inserted through the aperture.

The new cooking assembly will thus be seen to provide an electrically heated portable cooker which is energized or made operative by means of a rigid connection, through a handle form, to source terminals; the vessel is, in effect, plugged directly into a socket without an intervening cord. Handling of the vessel for such purpose is extremely easy, with the operation greatly assisted by the noted provision of wide or large contact areas, and, although two range environments have been shown, it will be appreciated that these are not exhaustive of the potential embodiments in which the cooker and cooperable terminal assembly described can be utilized to advantage. Whether used in spatial combination with an oven or as a separate cooking top, the present improvements not only provide new and superior individual units but a definite organization of space and function as distinguished from a random arrangement of distributed separately heated utensils.

Other modes of applying the principle of the invention may be employed, change being made as regards the details described, provided the features stated in any of the following claims or the equivalent of such be employed.

I, therefore, particularly point out and distinctly claim as my invention:

1. A cooking assembly comprising portable container means for food and the like including an enclosed electric heating element and having a handle device, said handle device carrying exposed generally flat contacts and having internal and hence concealed connections between said contacts and the heating element, and stationary socket means for direct substantially full insertion of the handle device of the container means therein, said socket means being adapted for connection to an available source of electric energy and including contact elements engaged by the exposed contacts of the handle device upon such insertion of the latter to complete therewith a circuit for energization of the heating element of the container means.

2. A cooking assembly comprising portable container means for food and the like including an enclosed electric heating element and having a handle device projecting laterally from the container means for lifting thereof, said handle device carrying exposed generally flat contacts and having internal and hence concealed connections between said contacts and the heating element, source terminal means including a cover having an aperture therein of such size and shape as to admit substantially the entire handle device of the container means, and stationary contacts adapted for connection to an available source of electric energy mounted behind said cover adjacent the aperture for engagement by the exposed contacts of the handle device upon substantially full insertion of the same, thereby to complete a circuit for energization of the heating element of the container means.

3. A cooking assembly comprising portable container means including an enclosed electric heating element and having a rigidly attached generally flat handle, said handle being made of electric insulation and being provided with exposed metallic contact surfaces connected by internal conductors to the heating element, and socket means for substantially full insertion of the handle of the container means therein when the latter is supported adjacent the socket means and advanced to insert the handle therein, the socket means including stationary contacts for connection to an available source of electric energy and for sliding engagement by the exposed contact surfaces of the inserted handle, the handle contact surfaces and the cooperable stationary contacts having relatively large areas for engagement and being disposed for limited relative lateral shifting without disruption of the engagement thereof, whereby the handle need not be precisely positioned in the socket means for effective connection of the container means and limited displacement of the connected container means will not interrupt the connection thereof.

4. A cooking assembly comprising electrically heated container means having a rigidly attached handle device projecting laterally at a side location above the bottom of the container means, said handle device carrying exposed generally flat contacts for connection of the container means to a source of electric energy, socket means for connection to such source and for receiving substantially the entire handle device, the socket means including circuit terminals engaged by the exposed contacts of the handle device when the latter is substantially fully inserted in the socket means, and switch means in circuit with said terminals, said switch means being normally open and closing in response to substantially full insertion of the handle device in the socket means.

5. A cooking assembly comprising a portable electric heating unit including temperature responsive control means and having a handle device, said handle device carrying a plurality of exposed contacts and being provided with internal connections respectively to the heating element and said control means of the unit, whereby said handle device contacts serve as terminals for the same, and socket means constructed and arranged for substantially complete reception of said handle device, said socket means including contacts for respective engagement with the exposed contacts of the handle device when the latter is inserted in the socket means and connection of the heating element and control means in external circuits.

6. A portable electrically heated cooker, comprising a vessel member having an electric heating element applied exteriorly to the bottom portion thereof, a hollow base open at the top and otherwise closed, said vessel being disposed within said base so that the latter encloses the bottom portion of the vessel member, means for uniting the vessel member and base in such relation, a handle secured to the base provided with exposed generally flat contact elements, conductors extending within the handle from said contact elements thereof to said electric heating element, whereby the handle contact elements serve as terminals for connection of the assembly to an available source of electric energy, and socket means for substantially full insertion of the handle therein, said socket means including supply contacts engaged by the handle contacts upon such insertion of the handle.

7. A portable electrically heated cooker comprising a vessel member having an electric heating element applied exteriorly to the bottom portion thereof and including a temperature sensing device, a hollow base open at the top and otherwise closed to receive said vessel member and to enclose the bottom portion of the same, means for uniting the vessel member and base in such relation, a handle secured to the base provided with exposed contact elements, conductors extending within the handle from certain of said contact elements thereof to said electric heating element, and further conductors extending from other contact elements of the handle to said temperature sensing device, whereby the handle contact elements serve as terminals for external connection of the electric heating element and the temperature sensing device.

8. A cooker as set forth in claim 6 wherein the enclosed bottom portion of the vessel member is spaced from the base unit thereabout to provide an insulating void therebetween.

9. A cooker as set forth in claim 6 including means for sealing the vessel member in the base unit against the entrance of liquids therebetween.

10. A cooker as set forth in claim 6 wherein the vessel member is removably attached to the base unit.

11. An electric cooker comprising receptacle means for food and the like having spaced apart inner and outer bottoms, an electric heating element applied exteriorly to the inner bottom of the receptacle means, a temperature sensing element also applied exteriorly to the inner bottom of the receptacle means, an insulative handle secured to the receptacle means, exposed conductive inserts in the handle, conductors extending within the handle from certain of said inserts to the electric heating element, and further conductors extending within the handle from other of said inserts to the temperature sensing element, whereby the handle also serves as a terminal assembly for external connection of the heating element and the temperature sensing element.

12. In a cooking assembly, a support surface, an upstanding enclosure adjacent said support surface having a plurality of apertures therein at a predetermined elevation above the surface, source terminal assemblies respectively positioned behind said apertures and adapted to be connected selectively to a source of supply, and a plurality of electrically heated container units adapted to be supported on said support surface, said container units being provided with handles carrying exposed generally flat terminals of the electric heating means thereof the apertures being formed to receive substantially entirely the handles of said container units, the handles being located and otherwise formed for direct substantially full insertion in said apertures and operative connection of their terminals to the source terminal assemblies respectively associated with the same with the container units resting on the support surface, whereby such connection of a container unit requires only placing the same on the support surface with its handle in register with the selected aperture and then sliding the container unit thus to insert the handle thereof.

13. The combination set forth in claim 12 including separate controls for the source terminal assemblies for individual regulation of the container units connected therewith.

14. In a cooking assembly, a support surface, a plurality of electric sockets mounted adjacent said support surface at a predetermined elevation above the same, and a plurality of portable heating units each including electric heating means and a handle device carrying exposed generally flat terminals of the heating means, the sockets being formed to receive substantially entirely the handle devices of said heating units, said handle devices being adapted for substantially full insertion in said sockets for external circuit connection of the unit heating means, with the handle devices spaced from the bottoms of the units such to be insertible in the sockets by sliding advance of the units when resting on the support surface, and the sockets and terminals of the handle devices accommodating limited relative lateral shifting thereof without operative disengagement.

15. A portable electrically heated cooking utensil comprising a vessel component having an electric heating element applied to the exterior bottom of the same, a hollow base component open at the top and having said vessel component fitted therein, liquid-tight sealing means interposed between the top of the base component and the opposed wall section of the vessel component, the opposed bottoms and sides of the two such components being appreciably spaced apart to provide an insulative void, a generally rectangular handle made of electric insulation disposed against an outer wall portion of the base component, a pair of conductive inserts in the handle having inserted shanks and exposed heads, fasteners extending from within the base component through such wall portion of the same in liquid sealed relation and into the handle to secure the latter to the base component, said fasteners being conductive and respectively engaged with the shanks of the handle inserts, conductors connecting the ends of the electric heating element to the fasteners within the base component, whereby the handle serves also as a terminal assembly for connection of the heating element therethrough to a source of supply, and socket means for receiving the handle, said socket means including source terminals engaged by the heads of the conductive inserts of the handle upon insertion of the latter in the socket means.

16. A cooking assembly comprising a portable heating unit containing an electric heating element and having a side wall, a handle of electrically insulative material projecting from said side wall, conductive inserts in said handle providing exposed generally flat contact surfaces on the same, conductors extending within the handle from said contact surfaces to said electric heating element, socket means for direct and substantially full insertion of the handle therein, and supply contacts within said socket means for engagement by the contact surfaces of the handle when the latter is substantially fully inserted in the socket means.

17. A cooking assembly as set forth in claim 16 wherein the heating unit includes a temperature sensing device having leads which extend to additional exposed contact elements on the handle, and the socket means includes further contacts for engagement by said additional handle contact elements.

18. A portable electric heating assembly comprising a vessel for receiving food and the like, electric heating means carried by said vessel, a pair of handle devices disposed respectively at and projecting laterally from opposite sides of said vessel for carrying of the same, one of said handle devices being at least partially electrically conductive and having terminal connections with the electrical ends of said heating means, and electrical receptacle means for operative connection with said one handle device, said receptacle means being formed to receive substantially entirely said one handle device and having contacts adapted to be connected to an available source of electrical energy and for engagement with the terminal connections of the heating means at said one handle device upon insertion of the latter in said receptacle means.

19. A portable electric heating assembly as set forth in claim 18 including a support for said vessel, and means mounting said receptacle means for insertion of said one handle device by placement and general sliding advance of the vessel on said support.

20. A portable electric heating assembly as set forth in claim 19 wherein said handle devices are spaced above the bottom plane of the vessel, and the receptacle means is mounted at a corresponding elevation with respect to said support.

References Cited in the file of this patent
UNITED STATES PATENTS

| | | |
|---|---|---|
| 1,177,082 | Antisell | Mar. 28, 1916 |
| 1,319,559 | Bjorkholm et al. | Oct. 21, 1919 |
| 1,948,402 | Teller et al. | Feb. 20, 1934 |
| 2,234,347 | Lobstein | Mar. 11, 1941 |
| 2,293,764 | Roeder | Aug. 25, 1942 |
| 2,440,128 | Sullivan | Apr. 20, 1948 |
| 2,450,336 | Hall | Sept. 28, 1948 |
| 2,519,433 | Brown | Aug. 22, 1950 |
| 2,571,782 | Swenson | Oct. 16, 1951 |
| 2,603,740 | Del Buttero | July 15, 1952 |
| 2,931,884 | Jepson et al. | Apr. 5, 1960 |
| 3,043,569 | Armentrout | July 10, 1962 |

FOREIGN PATENTS

| | | |
|---|---|---|
| 328,228 | Germany | Oct. 25, 1920 |
| 660,077 | Great Britain | Oct. 31, 1951 |
| 1,175,766 | France | Nov. 17, 1958 |